United States Patent [19]

Narukawa et al.

[11] Patent Number: 5,259,921
[45] Date of Patent: Nov. 9, 1993

[54] REMOVAL METHOD OF GLASS ADHERED TO SINTERED OBJECT DURING HOT ISOSTATIC PRESSING PROCESS

[75] Inventors: Akira Narukawa, Yokkaichi; Mitsuyoshi Watanabe; Hiroto Matsuda, both of Nagoya, all of Japan

[73] Assignee: NGK Insulators, Ltd., Japan

[21] Appl. No.: 844,491

[22] Filed: Mar. 4, 1992

[30] Foreign Application Priority Data

Mar. 8, 1991 [JP] Japan ................... 3-069100

[51] Int. Cl.⁵ .................. B44C 1/22; C03C 15/00; C03C 25/06
[52] U.S. Cl. ..................... 156/630; 156/657; 156/663; 252/79.5
[58] Field of Search ............... 156/630, 657, 662, 663, 156/667; 252/79.5; 423/344, 345; 419/26, 49, 68

[56] References Cited

U.S. PATENT DOCUMENTS

| | | | |
|---|---|---|---|
| 4,568,516 | 2/1986 | Adlerborn et al. | 419/26 |
| 4,842,840 | 6/1989 | Azuma et al. | 156/667 X |
| 4,853,204 | 8/1989 | Azuma et al. | 156/667 X |

FOREIGN PATENT DOCUMENTS

| | | |
|---|---|---|
| 0118702 | 9/1984 | European Pat. Off. |
| 0320927 | 6/1989 | European Pat. Off. |
| 1-153579 | 6/1989 | Japan |
| 2200317 | 8/1988 | United Kingdom |

*Primary Examiner*—William A. Powell
*Attorney, Agent, or Firm*—Parkhurst, Wendel & Rossi

[57] ABSTRACT

Method of removing a layer of glass formed on a sintered body which is manufactured by hot isostatic pressing of a preformed body of inorganic powder (e.g., silicon nitride powder and silicon carbide powder) in a pressure medium at a sintering temperature, wherein the sintered body of inorganic powder is retained in alkali solution at a high temperature for a predetermined time, preferably under a predetermined pressure.

9 Claims, No Drawings

REMOVAL METHOD OF GLASS ADHERED TO SINTERED OBJECT DURING HOT ISOSTATIC PRESSING PROCESS

BACKGROUND OF THE INVENTION

1. Field of the Invention

The present invention relates to a method of removing glass adhered to sintered objects of inorganic powder such as silicon nitride powder, silicon carbide powder or the like during hot isostatic pressing process.

2. Description of the Prior Art

In the manufacturing of sintered objects of silicon nitride, a preformed body of silicon nitride powder coated with high-melting glass is subjected to hot isostatic pressing during which the preformed powder body is isotropically pressed with a pressure medium such as inert gas under pressure at a sintering temperature. The hot isostatic pressing is advantageous to manufacture sintered objects of complicated shapes having the same strength in all directions at a high sintering temperature. During the hot isostatic pressing process, however, the glass used as a sealing material is inevitably adhered to recesses of the sintered powder body. To remove the adhered glass from the sintered powder body, there have been proposed a hammering method by applying a mechanical external force to the sintered body, a method of crystallizing the glass adhered to the sintered powder body under control of its cooling temperature after sintering to facilitate removal of the glass, and a method of vaporizing the pressure medium melted in the layer of glass for foaming the glass and cooling the foamed glass.

In the hammering method, it is required to mechanically apply a great external force to the sintered powder body for removal of the glass adhered thereto. This results in an increase of the manufacturing cost of this kind of sintered objects. The second crystallizing method is effective only in use of special glass such as silica glass. In the third method, foaming of the glass is greatly influenced by a condition of the hot isostatic pressing and the kind of the glass. For the foregoing reasons, it is very difficult to remove the glass from the sintered powder body at a low cost.

SUMMARY OF THE INVENTION

It is, therefore, a primary object of the present invention to provide a method capable of easily removing the glass from the sintered powder body at a low cost.

According to the present invention, the primary object is accomplished by providing a method of removing a layer of glass formed on a sintered body manufactured by hot isostatic pressing of a preformed body of inorganic powder such as silicon nitride powder, silicon carbide powder or the like with a pressure medium at a sintering temperature, wherein the sintered body of inorganic powder is retained in alkali solution at a high temperature for a predetermined time.

Preferably, the removal method of glass is actually practiced as follows:

(1) The sintered body is retained in alkali solution stored in a closed container under a predetermined pressure.

(2) Potassium hydroxide or sodium hydroxide is used as the alkali solution.

(3) The sintered body is retained in alkali solution at a temperature more than 100° C. for more than one hour.

In addition, the removal method of glass may be adapted to a sintered body manufactured by hot isostatic pressing of a preformed body of ceramic powder or metallic powder. In the hot isostatic pressing, nitrogen gas may be used as the pressure medium.

With the removal method of glass described above, the glass adhered to the sintered body can be effectively removed in a condition where the sintered body is retained at a high temperature under presence of alkali solution. In this case, it is desirable that potassium hydroxide or sodium hydroxide is used as the alkali solution, and it is also desirable that the sintered body is retained in the closed container at a high temperature for more than one hour. Since in the removal method a brittle reaction layer is formed in the layer of glass adhered to the sintered body, the finishing time of the sintered body can be shortened.

DESCRIPTION OF THE PREFERRED EMBODIMENT

Hereinafter, a preferred embodiment of the present invention will be described in detail. Prepared first in this embodiment were 3000–12000 preformed powder bodies each in the form of a silicon nitride ball of 13 mm in diameter containing 93 percent by weight $Si_3N_4$, 4 percent by weight $Al_2O_3$ and 3 percent by weight $Y_2O_3$. The preformed powder bodies were placed in a pot filled with borosilicate glass such as Pyrex glass containing 80.8 percent by weight $SiO_2$, 2.3 percent by weight $Al_2O_3$, 3.9 percent by weight $Na_2O$ and 12.5 percent by weight $B_2O_3$ the volume of which was approximately the same as the preformed powder bodies, and the pot was placed in a hot isostatic press device so that the preformed powder bodies are subjected to hot isostatic pressing at the sintering temperature of 1700° C. under 700 atmospheric pressure. The preformed powder bodies thus sintered were cracked into blocks of about 4 cm in diameter, and the blocks were placed in a HU-100 type decomposition container made by Sanai Kagaku Kabushiki Kaisha. To remove the glass from the sintered powder bodies, alkali solution of 40 ml was added into the decomposition container at various concentrations shown in attached Table 1. In this test for removal of the glass, the pressure in the container was determined as shown in attached Table 2 and calculated by Clapeyron-Clausius equation.

In Table 1, double circle marks in the column of heating temperature and time each represent a condition where almost all the glass was removed from the sintered powder blocks, single circle marks each represent a condition where the sintered powder blocks were still covered with the glass which can be removed by the conventional hammering method, and "X" marks each represent a condition where the glass can not be removed from the sintered powder blocks.

As is understood from Table 1, it has been found that the glass adhered to the sintered powder body can be effectively removed in a condition where the sintered powder body is retained at a high temperature under presence of alkali solution. In this case, it is desirable that potassium hydroxide or sodium hydroxide is used as the alkali solution, and it is also desirable that the sintered powder body is retained in the decomposition container at a high temperature for a long time. With the test results represented by the double circle marks, it has been confirmed that a potassium hydroxide reaction layer of about 100 microns is formed in the layer of glass adhered to the sintered powder body. Since the potassium hydroxide reaction layer is brittle, the layer of glass adhered to the sintered powder body can be easily removed by abrasive processing. This is useful to shorten the finishing time of the sintered object.

In another embodiment of the present invention, sintered powder bodies each in the form of a SiC block of $5 \times 5 \times 10^{mm}$ containing 98.5 percent by weight SiC, 0.8 percent by weight $B_4C$ and 0.5 percent by weight Free-carbon were manufactured by hot isostatic pressing in the same manner as described above and cracked into blocks of about 4 cm in diameter. The blocks of the sintered powder bodies were placed in the decomposition container used in the above embodiment. To remove the glass from the sintered powder bodies, alkali solution of 40 ml was added into the decomposition container at various concentrations shown in an attached Table 3. In Table 3, double circle marks in the column of heating temperature and time each represent a condition where almost all the glass was removed from the sintered powder blocks, single circle marks each represent a condition where the sintered powder blocks were still covered with the glass which can be removed by the conventional hammering method, and "X" marks each represent a condition where the glass can not be removed from the sintered powder blocks.

TABLE 2

| Reagent | Temp. (°C.) | Concentration (wt/v) % | Pressure (kg/cm²) |
|---|---|---|---|
| Potassium hydroxide | 160 | 22 | 6.9 |
| | | 40 | 5.7 |
| | 230 | 22 | 38.4 |
| | | 40 | 32.2 |
| Sodium hydroxide | 160 | 20 | 6.7 |
| | | 40 | 5.1 |
| | 230 | 20 | 37.4 |
| | | 40 | 30.7 |

TABLE 3

| | AMOUNT OF BLOCKS (g) | CONCENTRATION OF REAGENT (WT/V) % | AMOUNT OF REAGENT (ml) | Heating Temperature & Time |  |  |  |  |  |  |
|---|---|---|---|---|---|---|---|---|---|---|
| | | | | 160° C. | | | | 230° C. | | |
| | | | | 1 hr | 5 hr | 10 hr | 16 hr | 1 hr | 10 hr | 16 hr |
| Potassium hydroxide | 30 | 10 | 40 | x | x | ○ | ○ | x | ○ | ○ |
| | 30 | 20 | 40 | x | x | ○ | ○ | x | ○ | ⊙ |
| | 30 | 40 | 40 | x | ○ | ○ | ⊙ | ○ | ⊙ | ⊙ |
| Sodium hydroxide | 30 | 10 | 40 | x | ○ | ○ | ○ | ○ | ○ | ○ |
| | 30 | 20 | 40 | x | ○ | ○ | ○ | ○ | ○ | ○ |
| | 30 | 40 | 40 | x | ○ | ○ | ⊙ | ○ | ⊙ | ⊙ |
| Lithium hydroxide | 30 | 20 | 40 | x | x | x | x | x | x | ○ |
| | 30 | 40 | 40 | x | x | x | x | x | x | ○ |
| Potassium carbonate | 30 | 40 | 40 | x | x | x | x | x | x | c |

What is claimed is:

1. A method of forming a sintered body, comprising the steps of:
   forming a preformed body of inorganic powder;
   sintering said preformed body into a sintered body by hot isostatic pressing, said sintered body having an outer glass layer formed thereon during said hot isostatic pressing; and
   exposing said outer glass layer to an alkali solution to remove the outer glass layer.

2. The method of claim 1, wherein said outer glass layer is exposed to the alkali solution for not less than one hour.

3. The method of claim 1, wherein said outer glass layer is exposed to the alkali solution at a temperature not less than 100° C.

4. The method of claim 1, further comprising the step of abrading the outer glass layer after exposure to the alkali solution.

TABLE 1

| | AMOUNT OF BLOCKS (g) | CONCENTRATION OF REAGENT (WT/V) % | AMOUNT OF REAGENT (ml) | Heating Temperature & Time |  |  |  |  |  |  |
|---|---|---|---|---|---|---|---|---|---|---|
| | | | | 160° C. | | | | 230° C. | | |
| | | | | 1 hr | 5 hr | 10 hr | 16 hr | 1 hr | 10 hr | 16 hr |
| Potassium hydroxide | 30 | 10 | 40 | x | x | ○ | ○ | x | ○ | ○ |
| | 30 | 20 | 40 | x | x | ○ | ○ | x | ○ | ⊙ |
| | 30 | 40 | 40 | x | ○ | ○ | ⊙ | ○ | ⊙ | ⊙ |
| Sodium hydroxide | 30 | 10 | 40 | x | ○ | ○ | ○ | ○ | ○ | ○ |
| | 30 | 20 | 40 | x | ○ | ○ | ○ | ○ | ○ | ⊙ |
| | 30 | 40 | 40 | x | ○ | ○ | ⊙ | ○ | ⊙ | ⊙ |
| Lithium hydroxide | 30 | 20 | 40 | x | x | x | x | x | x | ○ |
| | 30 | 40 | 40 | x | x | x | x | x | x | ○ |
| Potassium carbonate | 30 | 40 | 40 | x | x | x | x | x | x | ○ |
| Sodium carbonate | 30 | 40 | 40 | x | x | x | x | x | x | ○ |
| Hydrofluoric acid | 30 | 10 | 40 | x | x | x | x | x | x | ○ |
| Water | 30 | | 40 | x | x | x | x | x | x | x |

5. The method of claim 1, wherein the sintered body is submerged in a closed container of alkali solution.

6. The method of claim 1, wherein said inorganic powder comprises at least one of silicon nitride powder and silicon carbide powder.

7. The method of claim 1, wherein said alkali solution comprises at least one of potassium hydroxide and sodium hydroxide.

8. The method of claim 1, wherein said hot isostatic pressing is carried out under a pressure of about 5.1 to about 38.4 kg/cm$^2$.

9. A method of forming a sintered body comprising the steps of:
   forming a preformed body of inorganic powder;
   placing said preformed body in a glass medium;
   hot isostatic pressing said preformed body in said glass medium, thereby forming a sintered body having an outer glass layer formed thereon; and
   exposing the outer glass layer to an alkali solution to remove the outer glass layer.

* * * * *